United States Patent
Kim et al.

(10) Patent No.: US 11,799,340 B2
(45) Date of Patent: Oct. 24, 2023

(54) STATOR ASSEMBLY OF HAIRPIN WINDING MOTOR AND MANUFACTURING METHOD THEREOF

(71) Applicant: HYUNDAI MOBIS Co., Ltd., Seoul (KR)

(72) Inventors: Yong Ho Kim, Yongin-si (KR); Hyoung Geun Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 208 days.

(21) Appl. No.: 17/111,015

(22) Filed: Dec. 3, 2020

(65) Prior Publication Data

US 2021/0175763 A1 Jun. 10, 2021

(30) Foreign Application Priority Data

Dec. 4, 2019 (KR) .................. 10-2019-0159500

(51) Int. Cl.
*H02K 3/12* (2006.01)
*H02K 15/06* (2006.01)
*H02K 1/16* (2006.01)

(52) U.S. Cl.
CPC .............. *H02K 3/12* (2013.01); *H02K 1/16* (2013.01); *H02K 15/064* (2013.01)

(58) Field of Classification Search
CPC .......... H02K 3/12; H02K 1/16; H02K 15/064
See application file for complete search history.

(56) References Cited

U.S. PATENT DOCUMENTS

| | | | | |
|---|---|---|---|---|
| 6,417,592 B2* | 7/2002 | Nakamura | ............... | H02K 3/12 310/198 |
| 7,928,626 B2* | 4/2011 | Kamibayashi | ........... | H02K 3/12 310/201 |
| 9,590,457 B2* | 3/2017 | Hattori | ..................... | H02K 3/16 |
| 11,088,601 B2* | 8/2021 | Hino | ....................... | H02K 1/165 |
| 11,283,335 B2* | 3/2022 | Ruggieri | .............. | H02K 15/064 |
| 11,444,497 B2* | 9/2022 | Degner | .................... | H02K 3/50 |
| 11,489,393 B2* | 11/2022 | Kim | ......................... | H02K 3/12 |
| 2012/0086300 A1* | 4/2012 | Kim | ....................... | H02K 1/148 310/215 |
| 2013/0192057 A1* | 8/2013 | Koga | ................... | H02K 15/085 29/596 |

(Continued)

FOREIGN PATENT DOCUMENTS

| | | |
|---|---|---|
| JP | 2010-041795 | 2/2010 |
| JP | 6329981 | 5/2018 |

(Continued)

OTHER PUBLICATIONS

Office Action dated Sep. 6, 2021 for Korean Patent Application No. 10-2019-0159500.

*Primary Examiner* — Robert W Horn
(74) *Attorney, Agent, or Firm* — H.C. Park & Associates, PLC

(57) ABSTRACT

A stator assembly includes hairpin coils continuously connected along a circumferential direction to form a coil winding, a plurality of stator cores disposed along the circumferential direction and configured to fix the hairpin coils, and a support ring configured to surround an outer circumferential surface of the stator core, wherein each of the stator cores is inserted into the hairpin coils forming the coil winding in a radial direction.

16 Claims, 11 Drawing Sheets

(56) References Cited

U.S. PATENT DOCUMENTS

| | | | | |
|---|---|---|---|---|
| 2015/0298537 A1* | 10/2015 | Duhamel | ............. | B60K 7/0007 |
| | | | | 301/6.5 |
| 2016/0056696 A1* | 2/2016 | Ito | ............................ | H02K 3/12 |
| | | | | 29/596 |
| 2017/0264173 A1* | 9/2017 | Koga | ........................ | H02K 3/48 |
| 2018/0262068 A1* | 9/2018 | Koshino | .................. | H02K 9/19 |
| 2018/0375448 A1 | 12/2018 | Sheu et al. | | |
| 2020/0358343 A1* | 11/2020 | Lee | ........................... | H02K 3/48 |
| 2021/0006141 A1* | 1/2021 | Ruggieri | .............. | H02K 15/063 |
| 2021/0175763 A1* | 6/2021 | Kim | ......................... | H02K 1/16 |
| 2021/0175784 A1* | 6/2021 | Kim | ..................... | H02K 15/085 |
| 2022/0006340 A1* | 1/2022 | Hunstable | ................. | H02P 6/10 |
| 2022/0037970 A1* | 2/2022 | Micucci | ............. | H02K 15/0087 |
| 2022/0069658 A1* | 3/2022 | Koo | .......................... | H02K 3/12 |
| 2022/0131436 A1* | 4/2022 | Stöck | ................ | H02K 15/0068 |
| 2022/0158513 A1* | 5/2022 | Ueda | ........................ | H02K 3/12 |
| 2022/0181935 A1* | 6/2022 | Tamura | .................... | H02K 3/28 |

FOREIGN PATENT DOCUMENTS

| | | |
|---|---|---|
| KR | 10-1135251 | 4/2012 |
| KR | 10-1776757 | 9/2017 |
| KR | 10-2019-0058068 | 5/2019 |
| WO | 2017/195637 | 11/2017 |

\* cited by examiner

STATOR ASSEMBLY OF HAIRPIN WINDING MOTOR AND MANUFACTURING METHOD THEREOF

CROSS-REFERENCE TO RELATED APPLICATION

This application claims priority from and the benefit of Korean Patent Application No. 10-2019-0159500, filed on Dec. 4, 2019, which is incorporated by reference for all purposes as if fully set forth herein.

BACKGROUND

Field

Exemplary embodiments relates to a stator assembly of a hairpin winding motor and a manufacturing method thereof, and more specifically, to a stator assembly of a hairpin winding motor of which the weight and volume are reduced to reduce the weight and secure an inner space of an automobile and a manufacturing method thereof.

Discussion of the Background

Research and development, and commercialization of eco-friendly automobile-related parts have actively proceeded in the automobile industry according to international demands for greenhouse gas reduction regulations and improvement of fuel efficiency of automobiles.

A technology for exerting a driving force using an electric motor is in development as a kind of an eco-friendly automobile-related part, and especially for this, a motor productivity technology including motor operating efficiency is also required.

Carmakers and manufacturers of eco-friendly parts apply hairpin coils to driving motors as a part of technology development to reduce the weight and volume of the eco-friendly parts.

Due to development of a technology for reducing the weight and volume of the eco-friendly parts, the weight of a vehicle or an eco-friendly vehicle can be reduced and an inner space can be secured.

A stator core of a driving motor to which a hairpin coil is applied according to the related art is formed of a magnetic material, and includes a yoke forming a magnetic path and a plurality of teeth spaced apart from each other at intervals to protrude radially inward from the yoke, and a plurality of hairpin coils inserted into a plurality of slots formed by the plurality of teeth spaced apart from each other at intervals.

Meanwhile, a method of manufacturing the stator core according to the related art is generally classified into a method in which shoes are formed on end portions of the teeth of the stator core and the hairpin coils are inserted in an axial direction, and a method in which the shoes of the teeth are removed and the hairpin coils are inserted in a radial direction.

First, in the method in which shoes are formed on the end portions of the teeth of the stator core and the hairpin coils are inserted in the axial direction, the hairpin coil is molded or formed in a U-shaped shape so that a coil or ring having a generally angular cross-section can be inserted into the slot of the stator core in advance, thereby making the hairpin coil.

Further, the shoes formed on inner ends of the teeth in a radial direction fix the hairpin coils inserted into the slots.

A method of manufacturing the driving motor to which the hairpin coil is applied, in which the shoes are formed on the end portions of the teeth, and the hairpin coils are inserted in the axial direction includes winding by inserting roughly 100 to 150 hairpin coils into the stator core and then twisting and welding opposite end portions, and even when one welding defect occurs at the ends of the hairpin coils, there is a problem that the hairpin coils cannot be used as a whole welding failure.

Further, when coils each having an angular cross-sectional area are twisted and bent to wind the hairpin coils, a film is thinned or damaged and thus the insulation performance is degraded in a process of forming the coils at a high load.

In the method in which the shoes of the teeth are removed and the hairpin coils are inserted in the radial direction, because stator core shoe portions are removed when stator divided cores are inserted in a radial direction after a hairpin winding bundle is made, noise, vibration, and harshness (NVH) are generated due to an increase of cogging torque and torque ripples, and the performance is adversely affected.

Because a shape of the stator core is designed according to a shape of the hairpin coils after the hairpin coils are manufactured, magnetic flux cannot be uniformly designed, and thus the end portions of the teeth of the stator core are saturated, and the performance can be degraded.

Accordingly, a method of increasing productivity of the stator core by reducing a defective rate, reducing the cogging torque and the torque ripples, and improving a fixing force of the hairpin coils is being looked for, but no satisfactory results have yet been obtained.

The above information disclosed in this Background section is only for understanding of the background of the inventive concepts, and, therefore, it may contain information that does not constitute prior art.

SUMMARY

Exemplary embodiments of the present disclosure is directed to providing a stator assembly of a hairpin winding motor capable of increasing productivity of a stator core by reducing a defective rate, reducing cogging torque and torque ripples, and improving a fixing force of hairpin coils, and a manufacturing method thereof.

According to an aspect of the present disclosure, there is provided a stator assembly of a hairpin winding motor including hairpin coils continuously connected along a circumferential direction to form a coil winding; a stator core configured to fix the hairpin coils; and a support ring configured to surround an outer circumferential surface of the stator core, wherein the stator core is inserted into the hairpin coils forming the coil winding in a radial direction.

Each of the hairpin coils may include a head portion exposed to the outside of the stator core in an axial direction, and leg portions configured to extend from one end and the other end of the head portion to be inserted into a core slot of the stator core, and the leg portions may be formed in a shape which is repeated in the circumferential direction by one pole pitch to be continuously connected.

A cross section of the leg portion may be formed in a trapezoidal shape of which the outside is broad and the inside is narrow, and thus a width may decrease in a direction toward an inner diameter from an outer diameter of the stator core.

The hairpin coils may be formed of a first coil which is a pair of hairpin coils disposed adjacent to each other in the radial direction, and a second coil which is a pair of hairpin coils disposed adjacent to each other in a radially outward direction from the first coil.

A length of the first coil in the radial direction may be greater than a length of the second coil in the radial direction, and a width of the first coil in the circumferential direction may be smaller than a width of the second coil in the circumferential direction.

The stator core may include a yoke formed of a magnetic material to form a magnetic path, teeth protruding in the radial direction from an inner circumferential surface of the yoke, a plurality of coil slots formed between the plurality of teeth and into which the hairpin coils are inserted, and shoes configured to extend in the circumferential direction from both side surfaces of end portions of the teeth.

The yoke may include a yoke body part forming a body, a first protruding part protruding from one surface in the circumferential direction at a radially outer side of the yoke body part, a first recessed part recessed in the circumferential direction at a radially inner side of the first protruding part, a second protruding part protruding from the other surface in the circumferential direction at a radially inner side of the yoke body part, and a second recessed part recessed in the circumferential direction at a radially outer side of the second protruding part, and a side surface of each of the first protruding part and the first recessed part and a side surface of each of the second protruding part and the second recessed part may be inclined to form a center angle of the yoke body part.

Each of the teeth may be formed in a rectangular shape, and thus widths of one end and the other end thereof may be the same.

According to another aspect of the present disclosure, there is provided a stator assembly of a hairpin winding motor including hairpin coils continuously connected along a circumferential direction to form a coil winding; a plurality of stator cores disposed along the circumferential direction and configured to fix the hairpin coils; and a support ring configured to surround an outer circumferential surface of the stator core, wherein each of the stator cores includes a yoke formed of a magnetic material to form a magnetic path, and the yoke includes a yoke body part forming a body, a first protruding part protruding from one surface in the circumferential direction at a radially outer side of the yoke body part, a first recessed part recessed in the circumferential direction at a radially inner side of the first protruding part, a second protruding part protruding from the other surface in the circumferential direction at a radially inner side of the yoke body part, and a second recessed part recessed in the circumferential direction at a radially outer side of the second protruding part.

A side surface of the second protruding part and a side surface of the first recessed part may be inclined to form a center angle of the yoke body part, and a side surface of the first protruding part and a side surface of the second recessed part may be inclined in the circumferential direction from the side surface of the second protruding part and the side surface of the first recessed part.

According to still another aspect of the present disclosure, there is provided a stator assembly of a hairpin winding motor including hairpin coils continuously connected along a circumferential direction to form a coil winding; a plurality of stator cores disposed along the circumferential direction and configured to fix the hairpin coils; and a support ring configured to surround an outer circumferential surface of the stator core, wherein each of the stator cores includes a yoke formed of a magnetic material to form a magnetic path, and the yoke includes a protrusion part protruding in the circumferential direction from one surface thereof, and a protrusion groove formed in a shape corresponding to the protrusion part in the other surface thereof, and into which the protrusion part adjacent thereto is inserted.

According to yet another aspect of the present disclosure, there is provided a method of manufacturing a stator assembly of a hairpin winding motor, in which hairpin coils are wound around a stator core having a plurality of coil slots, the method including providing the hairpin coils continuously connected to form a coil winding; inserting yokes forming the stator core into the hairpin coils; moving the hairpin coils outward from the inside of the hairpin coils to fix the hairpin coils to the plurality of yokes; and inserting a support ring configured to surround the stator core into an outer circumferential surface of the stator core, wherein a plurality of yokes are disposed along a circumferential direction.

The yokes may be inserted into the hairpin coils in a radially inward direction from the outside of the hairpin coils in inserting the yokes into the hairpin coils.

An outer diameter of the hairpin coil may be formed smaller than an outer diameter of the stator core in inserting the yokes into the hairpin coils.

In fixing the hairpin coils by the yokes, the outer diameter of the hairpin coil may be formed smaller than the outer diameter of the hairpin coil in inserting the yokes into the hairpin coils by pressurization of the yokes.

Teeth may protrude in a radial direction from inner circumferential surfaces of the plurality of yokes, and shoes may extend in the circumferential direction from both side surfaces of end portions of the teeth.

A distance between the shoes which are adjacent to each other may be greater than a thickness of the hairpin coil in inserting the yokes forming the stator core into the hairpin coils.

The distance between the shoes which are adjacent to each other may be smaller than the thickness of the hairpin coil in gathering the yokes in the radial direction to fix the hairpin coils.

The support ring may be inserted downward in an axial direction in inserting the support ring configured to surround the stator core into the outer circumferential surface of the stator core.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Advantages and characteristics of the present disclosure, and a method of achieving the above, will be apparent with reference to embodiments which will be described in detail in conjunction with the accompanying drawings. However, the inventive concepts are not limited to the embodiments which will be described below and may be implemented in different forms. The embodiments are provided to disclose the inventive concepts and convey the scope of the inventive concepts to those skilled in the art, and the inventive concepts are defined by the disclosed claims. Meanwhile, terms used in the description are provided not to limit the inventive concepts but to describe the embodiments. In the embodiment, the singular form is intended to also include the plural form unless the context clearly indicates otherwise. The terms "comprise" and/or "comprising" as used herein do not preclude the presence or addition of at least one other component, step, operation, and/or element other than the stated components, steps, operations and/or elements. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be . . . .

Hereinafter, embodiments of the inventive concepts will be described in detail with reference to the accompanying drawings.

Figure 1:
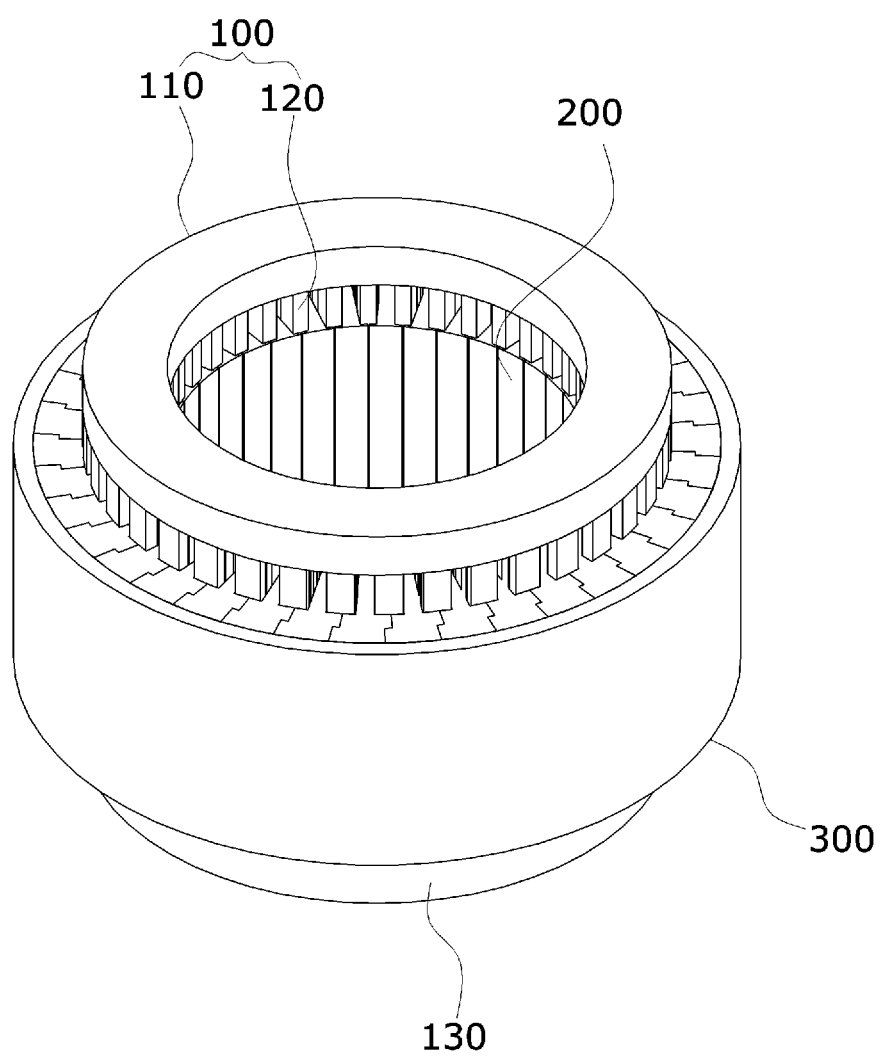
FIG. 1 is a perspective view illustrating a stator assembly of a hairpin winding motor according to one embodiment of the present disclosure.
Figure 2:
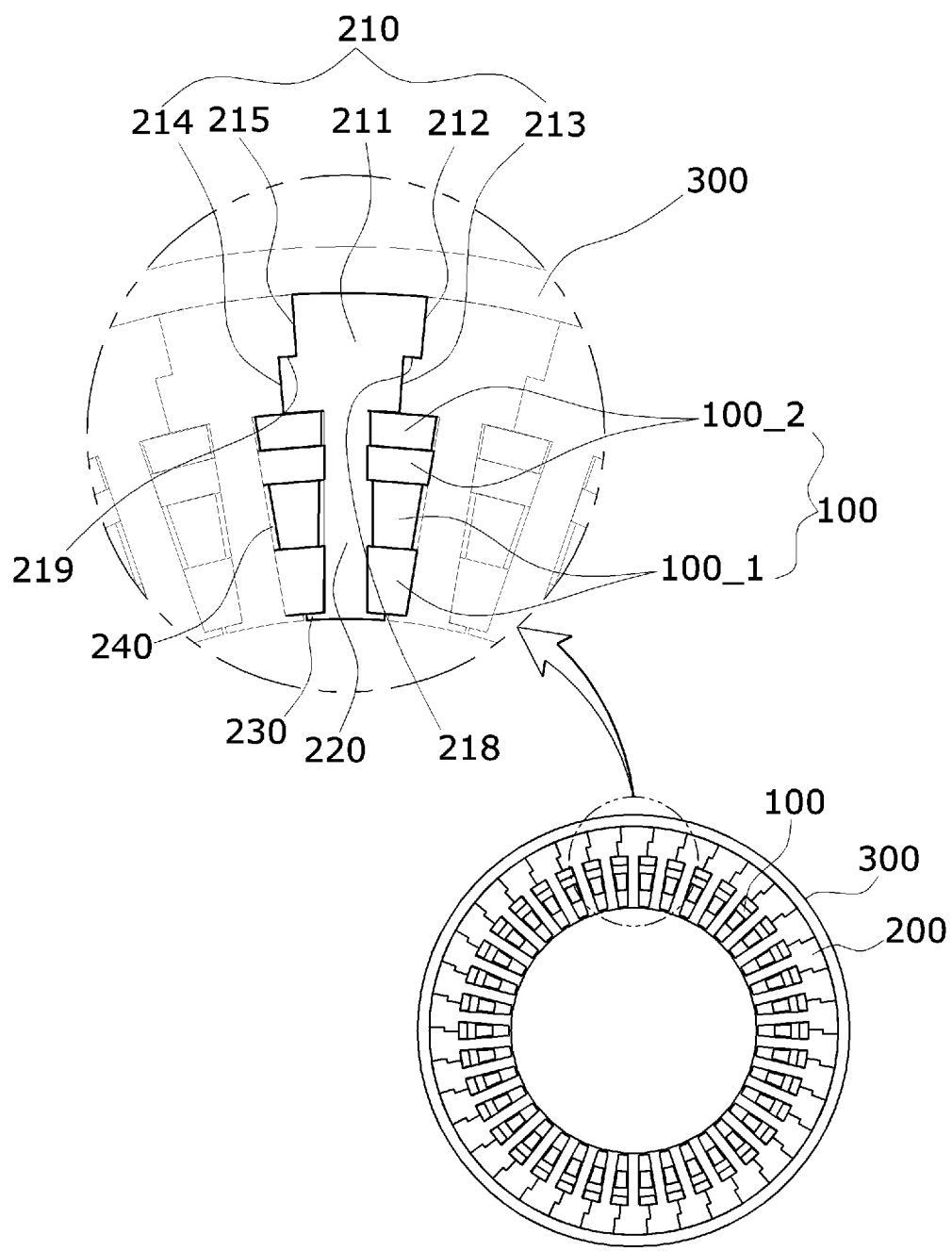
FIG. 2 is a plan view illustrating a coupling state between a hairpin coil, a stator core, and a support ring of the stator assembly of the hairpin winding motor according to one embodiment of the present disclosure.
Figure 3:
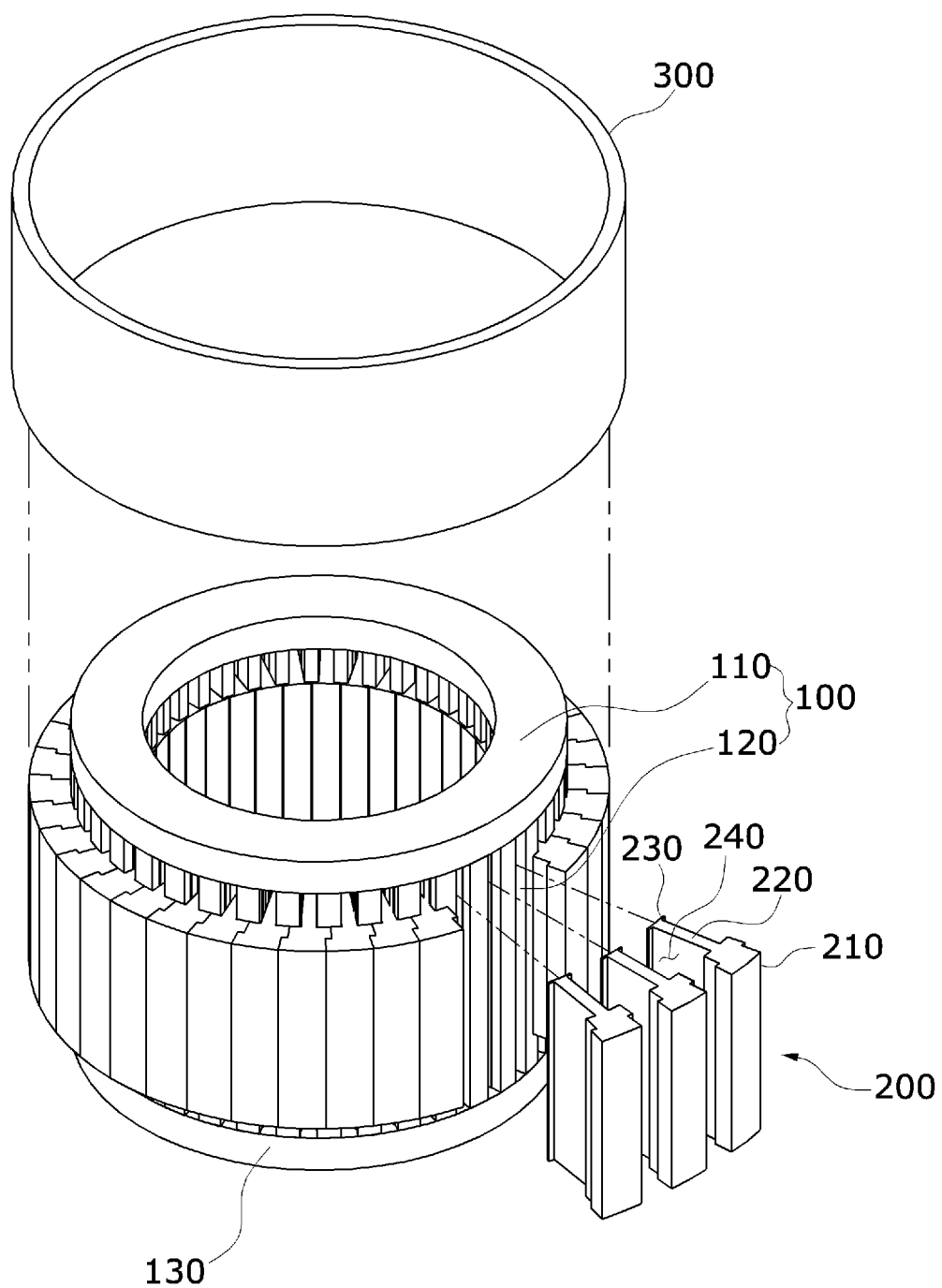
FIG. 3 is an exploded perspective view illustrating the stator assembly of the hairpin winding motor according to one embodiment of the present disclosure.
Figure 4:
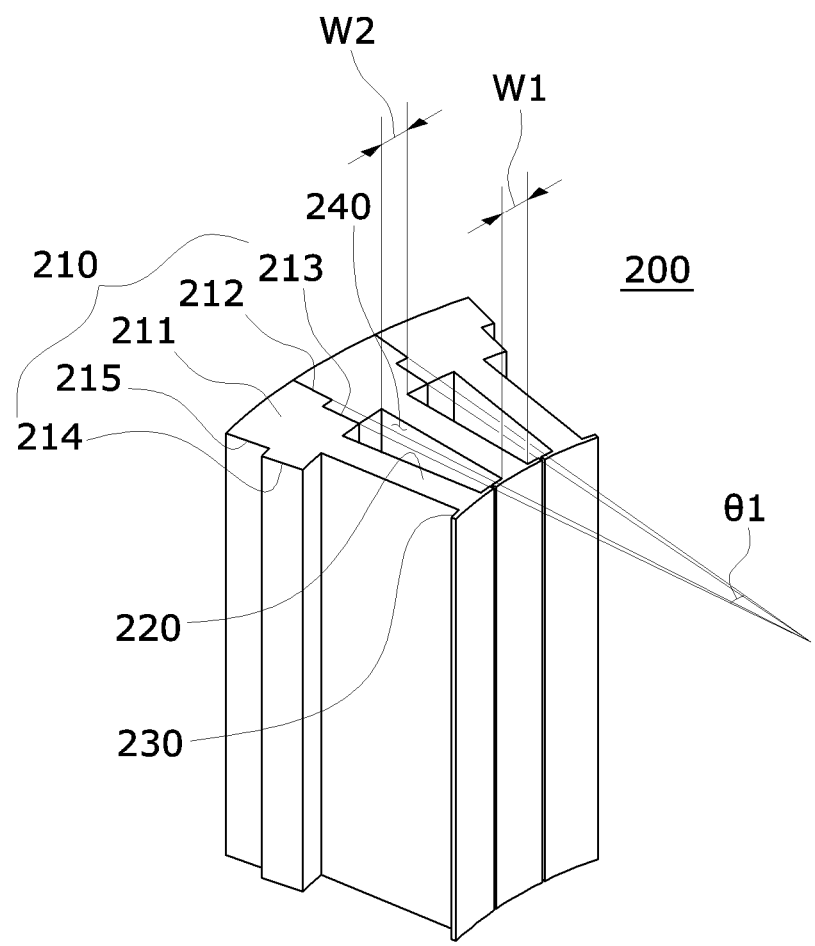
FIG. 4 is a perspective view illustrating a yoke of the stator assembly of the hairpin winding motor according to one embodiment of the present disclosure.
Figure 5:
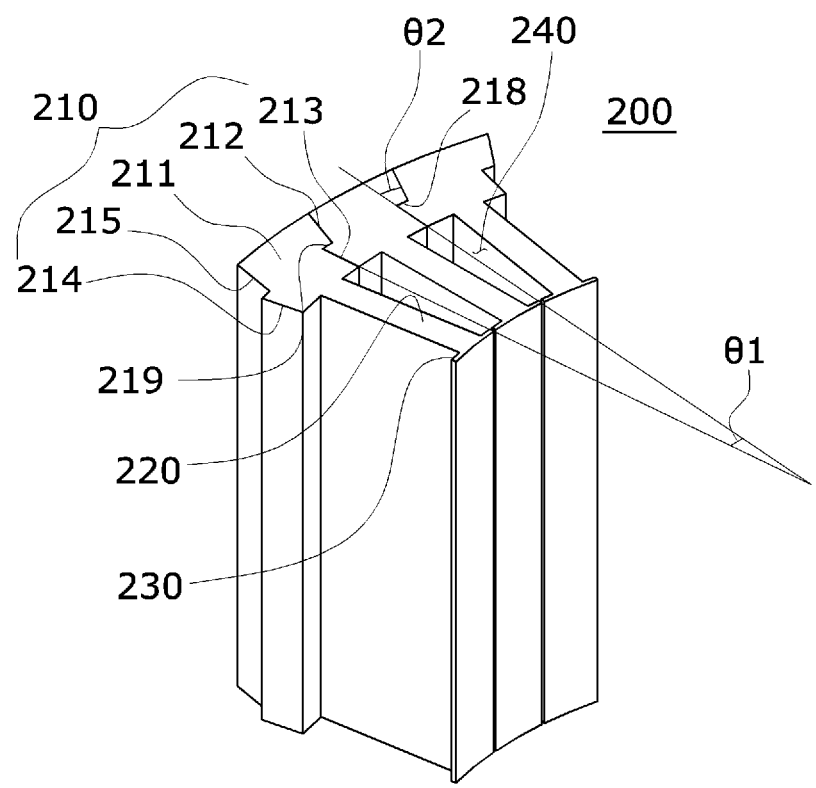
FIG. 5 is a perspective view illustrating a yoke of a stator assembly of a hairpin winding motor according to another embodiment of the present disclosure.
Figure 6:
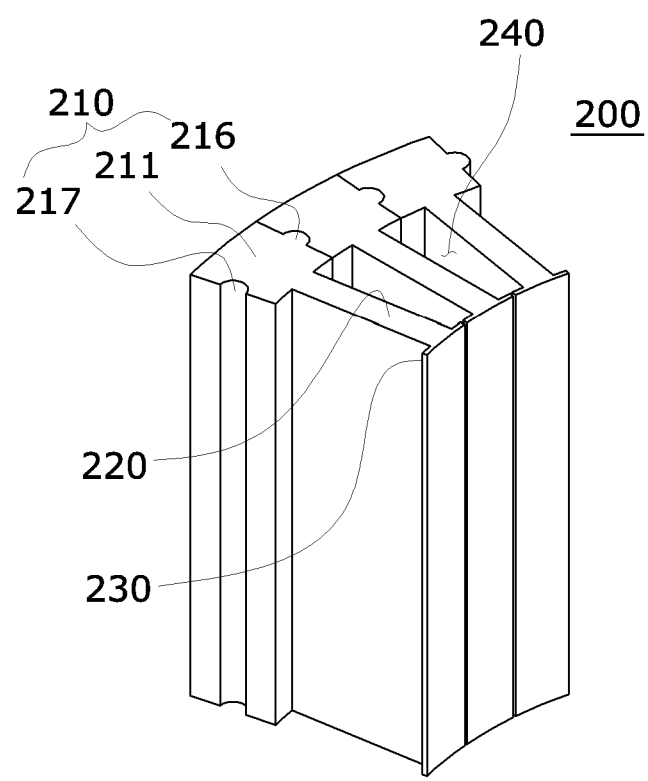
FIG. 6 is a perspective view illustrating a yoke of a stator assembly of a hairpin winding motor according to still another embodiment of the present disclosure.

FIG. 1 is a perspective view illustrating a stator assembly of a hairpin winding motor according to one embodiment of the inventive concepts, FIG. 2 is a plan view illustrating a coupling state between a hairpin coil, a stator core, and a support ring of the stator assembly of the hairpin winding motor according to one embodiment of the inventive concepts, FIG. 3 is an exploded perspective view illustrating the stator assembly of the hairpin winding motor according to one embodiment of the inventive concepts, FIG. 4 is a perspective view illustrating a yoke of the stator assembly of the hairpin winding motor according to one embodiment of the inventive concepts, FIG. 5 is a perspective view illustrating a yoke of a stator assembly of a hairpin winding motor according to another embodiment of the inventive concepts, and FIG. 6 is a perspective view illustrating a yoke of a stator assembly of a hairpin winding motor according to still another embodiment of the inventive concepts.

Referring to FIGS. 1 to 6, the stator assembly of the hairpin winding motor according to one embodiment of the inventive concepts includes a hairpin coil 100, a stator core 200, and a support ring 300.

The hairpin coil 100 is formed in plural, forms a coil winding in a circumferential direction, and is inserted into the stator core 200.

Further, the hairpin coils 100 forms the coil winding as end portions exposed in an axial direction from the stator core 200 are connected to each other, and raw coils coated with a coating and formed to have a straight length of a predetermined diameter are processed through a coil processor, and have connecting portions connected to each other.

In addition, a predetermined number of hairpin coils 100 are fitted into one slot in a stacked state to form the winding.

The hairpin coil 100 includes a head portion 110, leg portions 120, and foot portion 130.

The head and foot portions 110 and 130 are bent in a U shape and exposed to the outside of the stator core 200, and serve as a connection portion configured to connect a pair of leg portions 120 due to extension of the leg portions 120 from the head portion 110 to the foot portion 130.

The head portion 110 and foot portion 130 are items known to those skilled in the art, and thus are schematically illustrated not to obscure the principle of the inventive concepts.

The leg portions 120 extend from the head portion 110 to the foot portion 130 in parallel and are inserted into a core slot of the stator core 200, and are repeated in a circumferential direction by one pole pitch and formed in a continuously connected shape.

Because the plurality of hairpin coils 100 are continuously connected, the coil winding is formed in a circumferential direction.

Further, in the hairpin coil 100, two leg portions 120 disposed adjacent to each other in the circumferential direction are welded to each other.

Meanwhile, a cross-section of the leg portion 120 is formed in a trapezoidal shape.

More specifically, a cross-sectional shape of the leg portion 120 is formed in a shape of which the outside is broad and the inside is narrow, and thus a width decreases in an inner diameter direction from an outer diameter of the stator core 200.

The hairpin coils 100 including the head portion 110 and the leg portions 120 are formed of a first coil 100_1 and a second coil 100_2 according to insertion positions in the stator core 200.

As illustrated in FIG. 2, two hairpin coils 100 disposed adjacent to each other in a radial direction are a pair of first coils 100_1, and two hairpin coils 100 disposed adjacent to each other in a radially outward direction from the first coils 100_1 are a pair of second coils 100_2.

That is, the pair of first coils 100_1 and the pair of second coils 100_2 each form the coil winding in the circumferential direction and are inserted into coil slots 240 of the stator core 200.

A length of the pair of first coils 100_1 in the radial direction is greater than a length of the pair of second coils 100_2 in the radial direction, and a width of the pair of first coils 100_1 in the circumferential direction is smaller than a width of the pair of second coils 100_2 in the circumferential direction is formed.

Accordingly, because the hairpin coils 100 of the inventive concepts are formed of two types of coils such as the pair of first coils 100_1 and the pair of second coils 100_2, a shape of the hairpin coil 100 may be optimized according to a shape of the coil slot 240 of the stator core 200 to reduce manufacturing costs of the hairpin coils 100 by roughly 20% to 40%.

Meanwhile, for convenience of description, in the inventive concepts, it is described that four hairpin coils 100 are formed, and the hairpin coils 100 are formed of the pair of first coils 100_1 and the pair of second coils 100_2, but four or more, for example, four to ten or more hairpin coils 100 may be repeatedly formed in the radial direction.

The stator core 200 is disposed in plural along the circumferential direction, and fixes the hairpin coils 100, and is inserted into the hairpin coils 100 forming the coil winding, in the radial direction.

The stator core 200 includes a yoke 210, tooth 220, a shoe 230, and a coil slot 240.

The yoke 210 forms a body of the stator core 200, and is formed of a magnetic material to form a magnetic path.

Further, as illustrated in FIG. 3, a single yoke 210 is part of a plurality of yokes 210 that are disposed along a circumferential direction.

The plurality of yokes 210 are coupled inward from an outer side in a radial direction.

Typically, when one of the plurality of yokes 210 is separated from coupling, the coupling of the plurality of yokes 210 is released.

To prevent this, the yoke 210 of the inventive concepts includes a yoke body part 211, a first protruding part 212, a first recessed part 213, a second protruding part 214, and a second recessed part 215.

The yoke body part 211 forms a body of the yoke 210.

The first protruding part 212 protrudes from a radially outer side of the yoke body part 211 in a circumferential direction.

Further, the first recessed part 213 is recessed in a circumferential direction from a radially inner side of the yoke body part 211 as the first protruding part 212 projects outwards in the circumferential direction from a radially outward portion of the yoke body part 211.

Accordingly, a first step 218 is formed between the first protruding part 212 and the first recessed part 213.

The second protruding part 214 protrudes from another surface in the circumferential direction at a radially inner side of the body part 211, that is, a surface opposite the first recessed part 213.

Further, the second recessed part 215 is recessed in the circumferential direction at a radially outer side of the second protruding part 214, that is, a surface opposite the first protruding part 212 that is formed from the yoke body part 211.

Accordingly, a second step 219 is formed between the second protruding part 214 and the second recessed part 215.

Further, the first protruding part 212 protrudes in a shape corresponding to the second recessed part 215, and the first recessed part 213 protrudes in a shape corresponding to the second protruding part 214.

In addition, as illustrated in FIG. 4, a side surface of each of the first protruding part 212 and the first recessed part 213 and a side surface of each of the second protruding part 214 and the second recessed part 215 are inclined to form a center angle θ1 of the yoke body part 211. The center angle θ1 corresponds to a distance between the first step 218 and the second step 219.

That is, the first protruding part 212 of the yoke 210 comes into contact with the second recessed part 215 of the yoke 210 adjacent to the yoke in one direction, and the second protruding part 214 of the yoke 210 comes into contact with the first recessed part 213 of the yoke 210 adjacent to the yoke in the other direction.

Accordingly, the yoke 210 may solidly prevent separation from the inner side to the outer side or the outer side to the inner side due to the first step 218 formed between the first protruding part 212 and the first recessed part 213 and the second step 219 formed between the second protruding part 214 and the second recessed part 215.

In another embodiment of the yoke 210 of the inventive concepts, a shape of each of the first protruding part 212 and the second recessed part 215 may be different.

For example, as illustrated in FIG. 5, the side surfaces of the second protruding part 214 and the first recessed part 213 are inclined to form reference lines for the center angle θ1 of the yoke body part 211. The side surface of the first protruding part 212 and the side surface of the second recessed part 215 may be formed in at inclined angle θ2 in a circumferential direction from the side surface of the second protruding part 214 and the side surface of the first recessed part 213.

Accordingly, because adjacent yokes 210 come in contact with each other at the various step portions 218 and 219, the yokes 210 according to another embodiment of the inventive concepts may be solidly coupled to each other.

In still another embodiment of yokes 210 of the inventive concepts, a protrusion part 216 and a protrusion groove 217 may be formed at two side surfaces of the yoke 210 to prevent separation of the plurality of yokes 210 coupled to each other in a radial direction.

Specifically, as illustrated in FIG. 6, the protrusion part 216 protrudes from a center of one surface of the yoke body part 211 in a circumferential direction, and the protrusion groove 217 is formed in a shape corresponding to the protrusion part 216 in the other surface of the yoke body part 211, and thus the protrusion part 216 of the yoke 210 adjacent to the other surface of the yoke body part 211 is inserted.

That is, in the yokes 210 according to embodiments of the inventive concepts, an area in which the protrusion part 216 and the protrusion groove 217 provides an alternative for solid coupling between adjacent yokes 210 to prevent the separation of the plurality of yokes 210 coupled in a radial direction.

Teeth 220 protrude from inner circumferential surfaces of the yokes 210 in a radial direction, and may be continuously disposed in the radial direction from the yoke body parts 211 of the yokes 210 disposed in a circumferential direction to form an overall circular ring shape.

Further, because each of the teeth 220 is formed to have a width smaller than that of the yoke body part 211, coil slots 240 into which hairpin coils 100 are inserted may each be formed between the plurality of teeth 220.

In addition, because the leg portion 120 of the hairpin coil 100 inserted into the coil slot 240 is formed in a trapezoidal shape of which the outside is broad and the inside is narrow, a cross-sectional shape of each of the teeth 220 is formed in a rectangular shape.

Accordingly, as illustrated in FIG. 4, because each of the teeth 220 is formed in a rectangular shape, a width W1 of one end which is an insertion direction into the coil slot 240 and a width W2 of the other end which is a direction opposite the insertion direction into the coil slot 240 are formed to be substantially the same.

Accordingly, because a space factor between the leg portions 120 and a stator core 200 increases and a saturation degree of the stator core 200 decreases, magnetic flux density is uniform and thus the output performance of a driving motor may be improved by roughly 3% to 5%.

Shoes 230 extend in a circumferential direction from both side surfaces of end portions which extend from the yoke body part 211 of the tooth 220, and prevent separation of the hairpin coil 100 inserted into the coil slot 240 in a center direction of the yoke body part 211.

The coil slots 240 are formed between the plurality of teeth 220 and allow the hairpin coils 100 to be inserted thereinto, and the coil slots 240 are formed by the teeth 220 and thus the center direction of the yoke body part 211 is opened, and a direction toward the yoke body part 211 and an outer side surface thereof are closed.

Further, the coil slot 240 is formed in a trapezoidal shape of which the outside is broad and the inside is narrow to correspond to a cross-sectional shape of the hairpin coil 100.

That is, because the coil slot 240 is formed in the trapezoidal shape along the circumferential direction of the yoke 210 which is formed in a circular shape as a whole, the cross-sectional shape of the teeth 220 is formed in a rectangular shape and thus cross-sectional thicknesses of the teeth 220 are formed to be the same.

A support ring 300 surrounds an outer circumferential surface of the stator core 200, that is, outer circumferential surfaces of the plurality of yokes 210 divided into a plurality in the circumferential direction, and presses and fixes the divided yokes 210 in an axial direction.

Accordingly, the support ring 300 may solidly fix the yokes 210 divided into a plurality.

Hereinafter, a method of manufacturing the hairpin coils 100 according to one embodiment of the inventive concepts will be described in detail with reference to the accompanying drawings.

Figure 7:
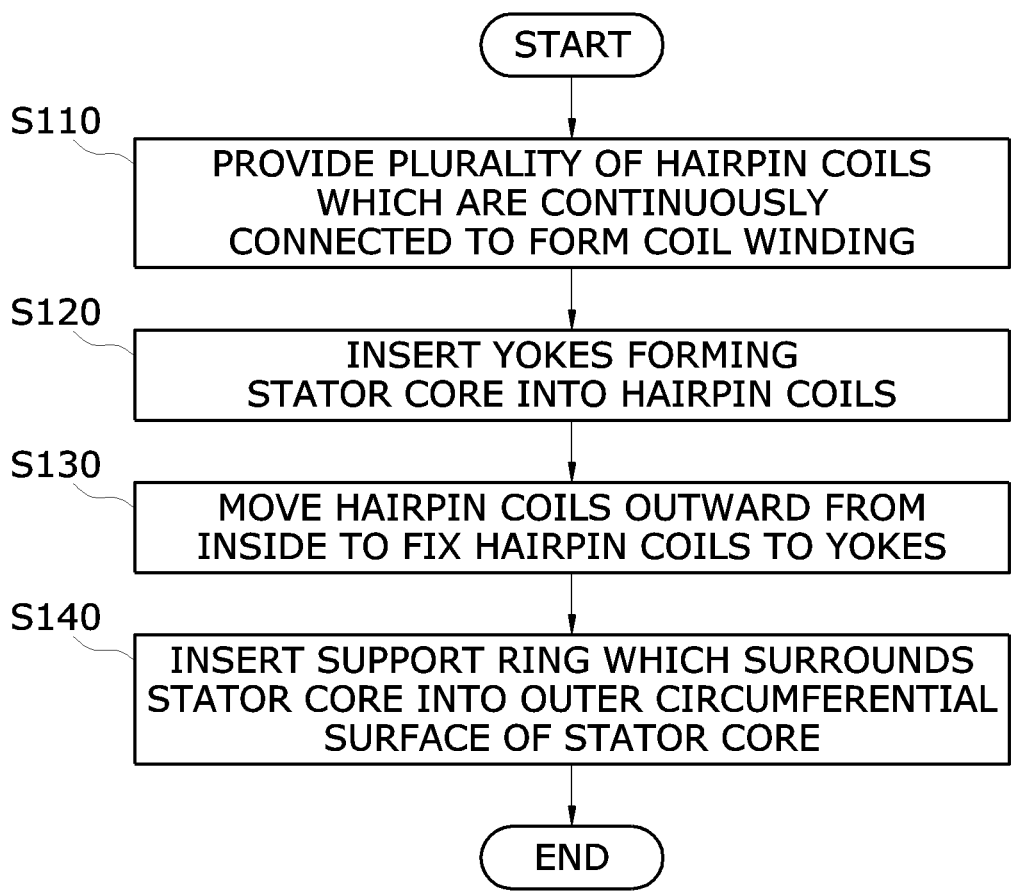
FIG. 7 is a flow chart illustrating a method of manufacturing the stator assembly of the hairpin winding motor according to one embodiment of the present disclosure.

FIG. 7 is a flow chart illustrating a method of manufacturing the stator assembly of the hairpin winding motor according to one embodiment of the inventive concepts, and FIGS. 8A to 8D are assembly drawings illustrating the method of manufacturing the stator assembly of the hairpin winding motor according to one embodiment of the inventive concepts.

Figure 8A:
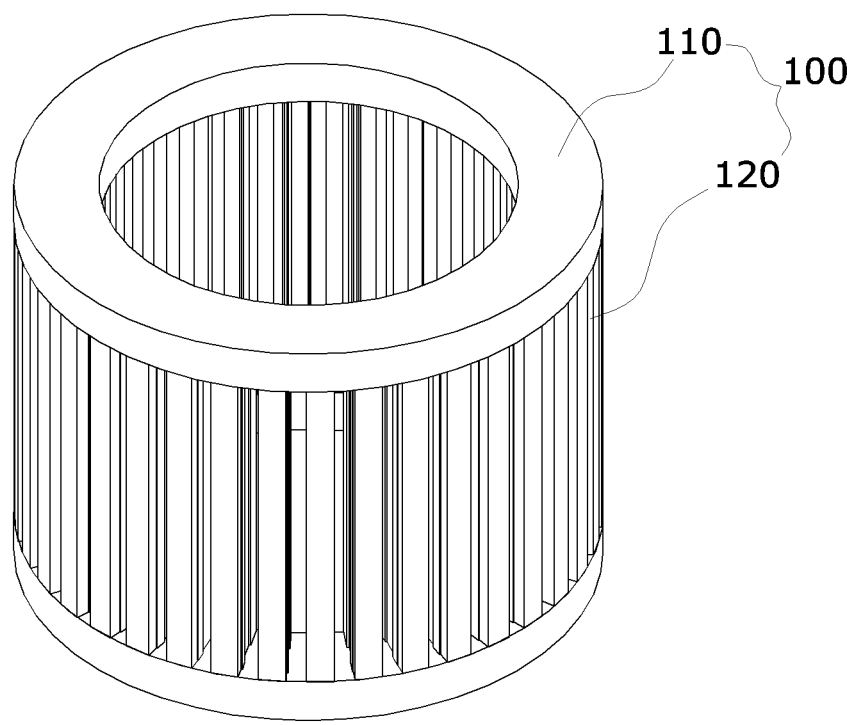
FIG. 8A, FIG. 8B, FIG. 8C and FIG. 8D are assembly drawings illustrating the method of manufacturing the stator assembly of the hairpin winding motor according to one embodiment of the present disclosure.

Referring to FIGS. 7 and 8A, first, a plurality of hairpin coils 100 continuously connected to each other in the circumferential direction to form a coil winding are provided (S110).

In the hairpin coils 100 of the inventive concepts which form the coil winding, raw coils coated with a coating and formed to have a straight length of a predetermined diameter are processed through a coil processor, and have connecting portions connected to each other.

Figure 8B:
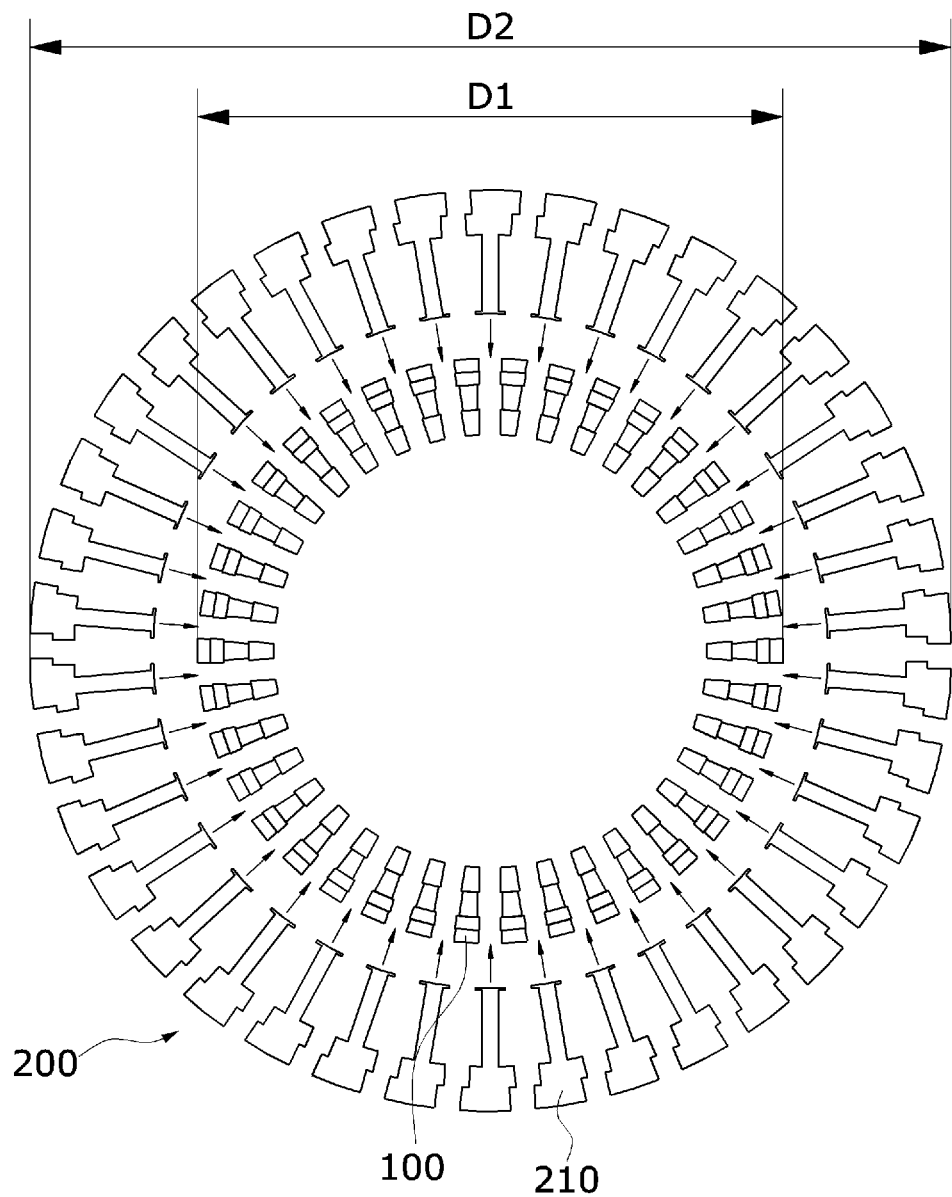

Further, referring to FIGS. 7 and 8B, yokes 210 forming a stator core 200 are inserted into the hairpin coils 100 (S120).

Meanwhile, the yokes 210 are continuously connected to each other in the circumferential direction to be inserted radially inward from the outside of the plurality of hairpin coils 100 forming the coil winding.

In this case, the plurality of yokes 210 are disposed to be spaced a distance apart from each other An outer diameter D2 of the plurality of yokes 210 disposed to be the distance spaced apart from each other is formed to be greater than an outer diameter D1 of the hairpin coils 100.

Further, teeth 220 protrude from the inner circumferential surfaces of the plurality of yokes 210 in the radial direction, and shoes 230 extend in a circumferential direction from both side surfaces of end portions of the teeth 220, a distance between the shoe 230 and the shoe 230 of the yoke 210 which is disposed adjacent to the shoe 230 is formed to be greater than a thickness of the hairpin coil 100.

Accordingly, the hairpin coil 100 may easily pass through a space between the shoe 230 and the shoe 230 of the yoke 210 which is disposed adjacent to the shoe 230 to be inserted into the coil slot 240.

Figure 8C:
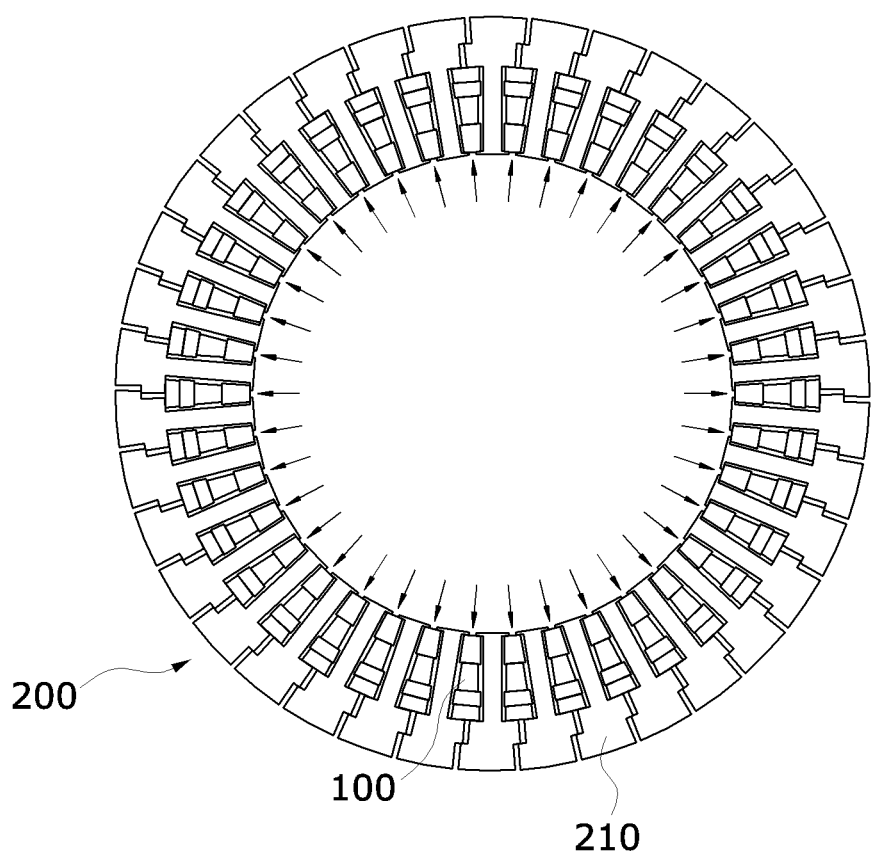
Figure 8D:
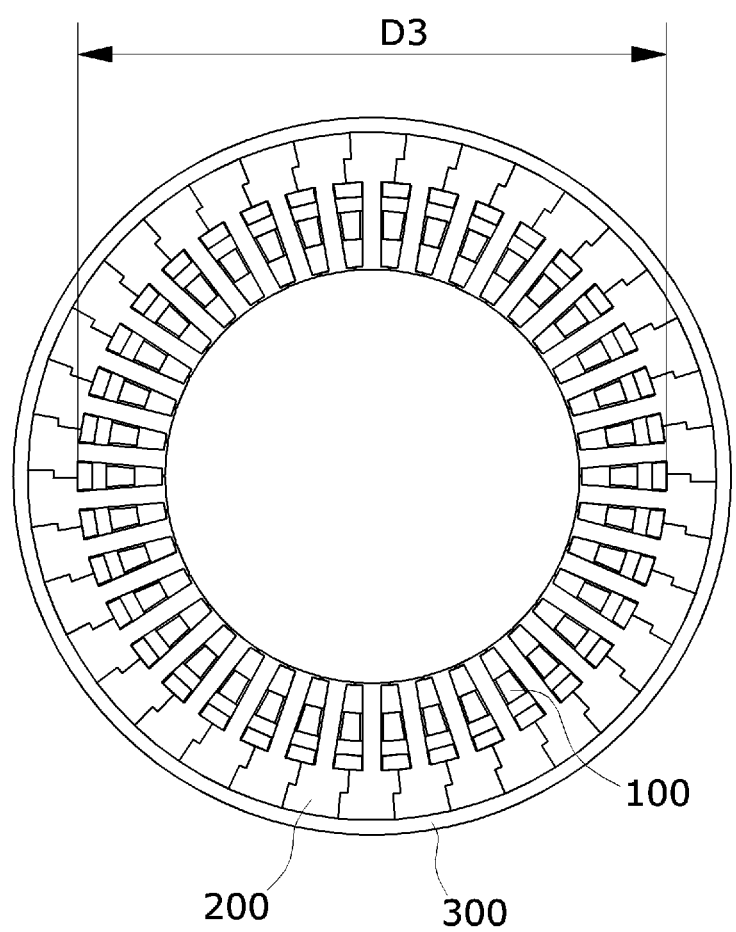

Further, referring to FIGS. 7 and 8C, the hairpin coils 100 are moved outward from the inside to be fixed to the coil slots 240 of the yokes 210 (S130).

In addition, distances between the shoe 230 of the plurality of yokes 210 and the shoe 230 of the yoke 210 which is disposed adjacent to the shoe 230 are formed to be smaller than the thickness of the hairpin coil 100.

Accordingly, the hairpin coils 100 may solidly prevent the separation from the coil slot 240 in a center direction of the yoke body part 211 of the yoke 210.

Further, a support ring 300 which surrounds the stator core 200 is inserted onto the outer circumferential surface of the stator core 200 (S140).

In this case, the support ring 300 which surrounds the stator core 200 is inserted downward in an axial direction when inserted onto the outer circumferential surface of the stator core 200.

Accordingly, the support ring 300 may solidly fix the yokes 210 which are divided into a plurality.

Further, an outer diameter D3 of the hairpin coils 100 is formed to be smaller than the outer diameter D1 of the hairpin coils 100 in the operation S120 due to a pressure from the plurality of yokes 210.

As described above, in the stator assembly of the hairpin winding motor according to the inventive concepts, because the stator core 200 is formed of a plurality of divided yokes 210, the yokes 210 which are adjacent to each other may be easily inserted into the hairpin coils 110 in the radial direction, the hairpin coils 100 may be solidly fixed to the stator core 200, and assembly productivity of the stator assembly may be improved.

Further, because the shoes 230 are formed on the end portions of teeth 220, cogging torque and torque ripples decrease and thus noise, vibration, and harshness (NVH) decrease, and accordingly, the performance of the driving motor may be improved.

In addition, because the leg portion 120 is formed in the trapezoidal shape of which the outside is broad and the inside is narrow, the magnetic flux density of the stator core 200 is uniform by increasing a space factor between the leg portion 120 and the slot, and accordingly, the output performance of the driving motor may be improved.

In a stator assembly of a hairpin winding motor according to the inventive concepts, because a stator core is formed of a plurality of divided yokes, the yokes which are adjacent to each other can be easily inserted into hairpin coils in a radial direction, the hairpin coils can be solidly fixed to the stator core, and the assembly productivity of the stator assembly can be improved.

Further, because shoes are formed on end portions of teeth, cogging torque and torque ripples decrease and thus noise, vibration, and harshness (NVH) decrease, and accordingly, the performance of a driving motor can be improved.

In addition, because a leg portion is formed in a trapezoidal shape of which the outside is broad and the inside is narrow, the magnetic flux density of a stator core is uniform by increasing a space factor between the leg portion and a slot, and accordingly, the output performance of a driving motor can be improved.

The inventive concepts are not limited to the above-described embodiments and may be variously modified within the scope of the technical spirit of the inventive concepts.

What is claimed is:

1. A stator assembly of a hairpin winding motor comprising:
a plurality of coil segments joined first end to second end to form a phase winding extending in a circumferential direction;
a stator core configured to fix the coil segments; and
a support ring configured to surround an outer circumferential surface of the stator core, wherein:
the coil segments and the stator core are inserted in a radial direction;
the coil segments comprise:
a first coil comprising a pair of first loops disposed adjacent to each other in the radial direction; and
a second coil comprising a pair of second loops disposed adjacent to each other in a radially outward direction from the first coil;
the first coil and the second coil are repeated in the radial direction;
a thickness of wire in the first coil in the radial direction is greater than a thickness of wire in the second coil in the radial direction; and
a thickness of wire in the first coil in the circumferential direction is less than a thickness of wire in the second coil in the circumferential direction.

2. The stator assembly of claim 1, wherein:
each of the coil segments includes a head portion exposed to the outside of the stator core in an axial direction, and leg portions configured to extend from one end and the other end of the head portion to be inserted into a core slot of the stator core; and
the leg portions are formed in a shape which is repeated in a circumferential direction by one pole pitch to be continuously connected.

3. The stator assembly of claim 2, wherein a cross section of the leg portion is formed in a trapezoidal shape of which the outside is broad and the inside is narrow, and thus a width decreases in a direction toward an inner diameter from an outer diameter of the stator core.

4. The stator assembly of claim 1, wherein the stator core includes a yoke formed of a magnetic material to form a magnetic path, teeth protruding in a radial direction from an inner circumferential surface of the yoke, a plurality of coil slots formed between the plurality of teeth and into which the coil segments are inserted, and shoes configured to extend in a circumferential direction from both side surfaces of end portions of the teeth.

5. The stator assembly of claim 4, wherein:
the yoke comprises a plurality of yoke bodies, each yoke body comprising a tooth and a pair of protruding parts disposed on opposing sides of the tooth in the circumferential direction;
the support ring holds the plurality of yoke bodies together compressively; and
the protruding part of one yoke body contacts the protruding part of an adjacent yoke body extending circumferentially around the stator.

6. The stator assembly of claim 4, wherein each of the teeth is formed in a rectangular shape, and widths of one end and the other end thereof are the same.

7. A method of manufacturing a stator assembly of a hairpin winding motor, in which coil segments are wound around a stator core having a plurality of coil slots, the method comprising:
providing a plurality of coil segments joined first end to second end to form a phase winding extending in a circumferential direction;
coupling a yoke forming the stator core and the coil segments; and
inserting a support ring configured to surround the stator core into an outer circumferential surface of the stator core,
wherein:
a plurality of yokes are disposed along a circumferential direction;
the coil segments comprise:
a first coil comprising a pair of first loops disposed adjacent to each other in the radial direction; and
a second coil comprising a pair of second loops disposed adjacent to each other in a radially outward direction from the first coil;
the first coil and the second coil are repeated in the radial direction;
a thickness of wire in the first coil in the radial direction is greater than a thickness of wire in the second coil in the radial direction; and
a thickness of wire in the first coil in the circumferential direction is less than a thickness of wire in the second coil in the circumferential direction.

8. The method of claim 7, wherein the yokes are moved inward from the outside to be coupled to the coil segments in coupling the yokes forming the stator core and the coil segments.

9. The method of claim 7, wherein the coil segments are moved outward from the inside to be coupled between the plurality of yokes in coupling the yokes forming the stator core and the coil segments.

10. The method of claim 7, wherein the yokes are inserted into the coil segments in a radially inward direction from the outside of the coil segments in inserting the yokes into the coil segments.

11. The method of claim 10, wherein an outer diameter of the coil segment is formed than an outer diameter of the stator core in inserting the yokes into the coil segments.

12. The method of claim 10, wherein in fixing the coil segments by the yokes, the outer diameter of the coil segment is less than an outer diameter of the stator core in inserting the yokes into the coil segments by pressurization of the yokes.

13. The method of claim 10, wherein:
teeth protrude in a radial direction from inner circumferential surfaces of the plurality of yokes; and
shoes extend in the circumferential direction from both side surfaces of end portions of the teeth.

14. The method of claim 13, wherein a distance between the shoes which are adjacent to each other is greater than a thickness of the coil segment in inserting the yokes forming the stator core into the coil segments.

15. The method of claim 13, wherein a distance between the shoes which are adjacent to each other is smaller than a thickness of the coil segment in gathering the yokes in the radial direction to fix the coil segments.

16. The method of claim 7, wherein the support ring is inserted downward in an axial direction in inserting the support ring configured to surround the stator core into the outer circumferential surface of the stator core.

\* \* \* \* \*